Oct. 4, 1938.   J. M. GOLDBERG   2,132,024
FILM REWIND DEVICE
Filed June 23, 1936
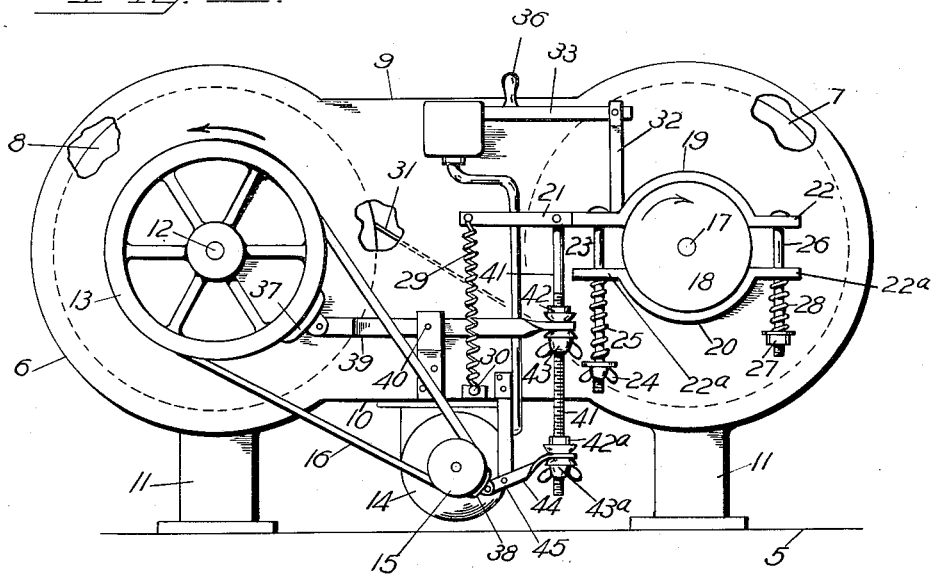
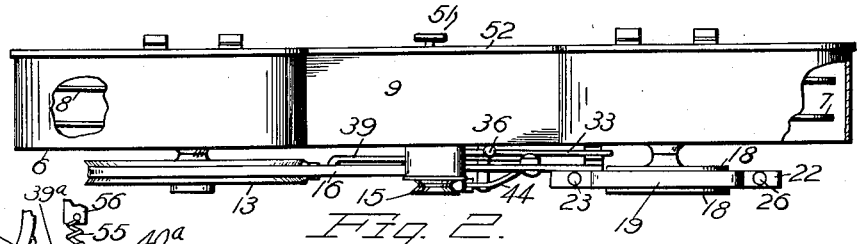
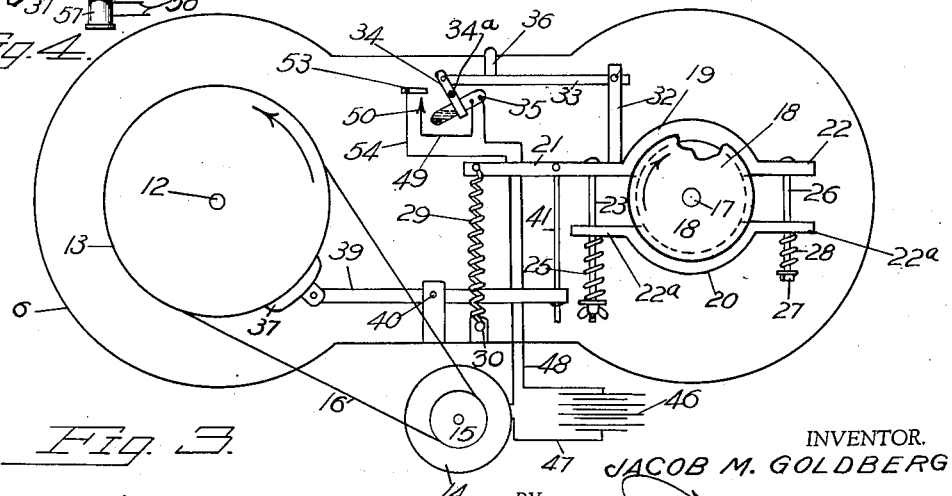
INVENTOR.
JACOB M. GOLDBERG
BY
ATTORNEY.

Patented Oct. 4, 1938

2,132,024

UNITED STATES PATENT OFFICE 2,132,024

FILM REWIND DEVICE

Jacob M. Goldberg, Denver, Colo.

Application June 23, 1936, Serial No. 86,785

1 Claim. (Cl. 242—57)

This invention relates to improvements in automatic film rewind mechanisms.

In the handling of moving picture films it is frequently necessary to wind films from one reel to another. When exhibiting moving pictures, the practice universally followed is to wind the film onto a take-up reel, after it has passed through the projector, and it then becomes necessary to rewind the film before it can again be exhibited.

The usual rewind apparatus consists of a casing in which are rotatably mounted a rewind and a supply reel. The rewind reel is driven by an electric motor and the supply reel is rotated by the film as it is unwound from it and onto the rewind reel. The supply reel is provided with a friction brake that is adjustable to give the film the proper tension. The current to the motor passes through a switch controlled by the friction brake in such a way that it will open if the film breaks and when the rewinding is complete.

When the rewind reel becomes partly full of film, its momentum is increased to such an extent that it will continue to rotate for some time after the current has been cut off from the motor, and this rotation will increase in duration in accordance with the increase in momentum. The rotation of the rewind reel after the current has been cut off from the motor, often injures and sometimes tears the end of the film with resultant damage.

It is the object of this invention to produce a rewind mechanism having a brake mechanism associated with the rewind reel in such a way that it will be immediately applied when the current is cut off from the motor so as to stop its rotation.

Another object of this invention is to produce a rewind mechanism provided with a safety switch in the motor circuit, which shall be open whenever the housing is open so as to prevent the motor from being accidentally started while the housing is open.

And a further object is to produce a rewind mechanism in which the switch that controls the motor shall be controlled by the friction brake applied to the supply reel in such a way that it will open whenever the film breaks and when the rewinding has been completed.

The above, and any other objects that may become apparent as the description proceeds are attained by means of a construction and arrangement of parts that will now be described, reference for this purpose being had to the accompanying drawing in which the invention has been illustrated in its present preferred form and in which—

Figure 1 is an elevation showing the rear side of the machine;

Figure 2 is a top plan view thereof;

Figure 3 is a diagram showing the electrical circuits; and

Figure 4 is a fragmentary view showing the rewind reel brake electrically controlled.

In the drawing, reference numeral 5 designates a surface on which the mechanism is supported and 6 the housing for the supply reel 7 and the rewind reel 8. The housing is preferably provided with rounded ends which are connected by substantially straight walls 9 and 10. The housing is also provided with two spaced pedestals 11.

The rewind reel 8 is mounted in the housing on a shaft 12. A grooved belt pulley 13 is connected with the outer end of shaft 12. A motor 14 is secured to the under surface of wall 10 and carries a pulley 15. A belt 16 connects pulleys 13 and 15.

The supply reel 7 is mounted on the inner end of shaft 17 and a grooved brake drum 18 is secured to the outer end of the shaft. A friction brake, of the Prony brake type, comprising two brake members 19 and 20, is applied to the brake drum. Member 19 has a long arm 21 and a short arm 22 and member 20 has two short arms 22a. A bolt 23 extends through openings in arms 21 and 22a and is provided with a wing nut 24. A spring 25 surrounds the bolt between the nut and the arm 22a. A bolt 26 extends through openings in arms 22 and 22a and is provided with an ordinary nut 27 between which and the arm 22a is located a spring 28. Springs 25 and 28 produce the pressure required to give the necessary braking effect. A spring 29 has its upper end connected with the arm 21 and its lower end connected with the housing at 30.

During the rewind operation, reel 8 is rotated in a counter-clockwise direction and since it is connected with reel 7 by means of the film 31, the supply reel will be rotated clockwise. When reel 7 and brake drum 18 rotate, the brake arm 21 tends to rotate clockwise and tensions spring 29.

When the film has been rewound, or if the film breaks, the force tending to rotate reel 7 will cease and the spring 29 will function to move the brake arm 21 downwardly.

A bracket 32 is secured to the brake member 19 and a connecting rod 33 has one end pivoted to the upper end thereof, and the other end pivoted to an arm 34 of a mounting, which carries a mercury switch 35 that rocks about pivot 34a. When the parts are stationary, they assume the position shown in Figure 3 in which the mercury switch is open, but when the rewinding takes place the rotation of the brake drum 18 holds brake member 19 in such a position that the mercury switch will be closed and remain closed as long as reel 7 rotates.

If the film breaks and when the film has all been unwound from reel 7, spring 29 functions to return the parts to the position shown in Figure 3, whereupon the circuit to the motor is broken. A handle 36 is attached to the connecting rod 33 and when the machine is to be started, the operator grasps the handle and moves it towards the right until the mercury switch closes, whereupon the motor starts.

Unless a brake mechanism is provided for the rewind reel 8, the momentum of the reel and the motor rotor will keep them rotating for a short time after the current has been cut off from the motor. If the rewind reel is full of film, the kinetic energy stored therein will be sufficient to keep the parts rotating for a considerable length of time. During the rotation of reel 8, the loose end of the film becomes scratched and sometimes badly damaged.

In order to bring the rewind reel and the motor to a stop as soon as possible after switch 35 has opened, a brake has been provided which is applied either to the pulley 13 or to the motor pulley 15 or to both, as soon as the switch 35 opens. This may be effected in a variety of ways and in Figures 1 and 3 a mechanical interconnection between the brake arm 21 and the brake shoes 37 and 38 has been shown. A lever 39 is pivoted intermediate its ends to a stationary pivot 40 and carries the brake shoe 37 at one end. The other end of lever 39 is connected with the brake arm 21 by means of a rod 41. Nuts 42 and 43 serve to adjust the parts.

If two brakes are used, a lever 44 is pivoted at 45 and carries the brake shoe 38 at one end. The other end is connected with rod 41 by means of nuts 42a and 43a. It is seldom that a brake is necessary on both pulleys 13 and 15, as a brake associated with either is sufficient. In the drawing, the two brakes have been shown, either of which may be omitted.

It is evident that the specific position of the brake for the rewind reel is a matter of choice as the object to be attained is to stop the rotation of the rewind reel.

In Figure 3, the source of current supply has been designated by numeral 46. A conductor 47 runs directly to the motor. Another conductor 48 runs to one contact of the mercury switch. A conductor 49 runs from the other contact of the mercury switch to the stationary contact 50 of a switch controlled by the latch 51 of the cover 52.

A movable contact 53 is so arranged that it will make electrical connection with the stationary contact 50 only when the cover is closed and latched. A conductor 54 extends from the contact 53 to the other pole of the motor. It will be seen that the motor cannot be started until the switch controlled by the cover latch is closed, which prevents accidental injury due to the closing of switch 35 while the cover is open.

In Figure 4, an electromagnetically controlled brake mechanism has been shown in which lever 39a has one end pivoted at 40a and the other end provided with a brake shoe 37. A spring 55 extends between the lever and a stationary abutment 56. Spring 55 is always under tension and tends to apply the brake. A magnet 57 is positioned below the lever 39a and connected in parallel with the motor by means of wires 58'. When the motor operates, magnet 57 is energized and attracts the armature 58, thereby holding the brake in inoperative position. As soon as switch 35 is opened, the spring 55 functions to apply the brake. By the arangement illustrated in Figure 4, the construction is simplified and the desired effect is obtained.

After the reels have been put into position and the cover is closed and latched, the operator grasps the handle 36 and moves it towards the right until the mercury switch closes, whereupon the motor starts and the rewinding of the film commences. When the film has been rewound or if it breaks the supply reel stops rotating due to the action of the friction brake and spring 29 functions to open switch 35 and apply the brake to the rewind reel.

It will be apparent from the above that by the simple expedient of providing a brake for the rewind reel the latter can be stopped as soon as the circuit to the motor is opened whereby injury to the free end of the film is prevented.

What I claim and desire to secure by Letters Patent is:

In a film rewind mechanism having a support, two shafts rotatably mounted in the support in spaced parallel relation, a supply reel non-rotatably mounted on one shaft, a rewind reel non-rotatably mounted on the other shaft, a friction brake associated with the supply reel shaft, an electric motor operatively connected with the rewind reel shaft, a switch in the motor circuit, means responsive to the movement of the friction brake for opening and closing the switch, two separate brake devices, one associated with the rewind reel and the other with the motor, means for simultaneously moving the two brake devices into inoperative position when the switch is closed and means comprising a spring for moving the brake devices into operative position when the switch is opened.

JACOB M. GOLDBERG.